(12) United States Patent
Kim et al.

(10) Patent No.: US 6,594,897 B2
(45) Date of Patent: Jul. 22, 2003

(54) METHOD FOR MANUFACTURING COOLANT TUBE OF HEAT EXCHANGER

(75) Inventors: Yong Jae Kim, Chungcheongnam-do (KR); Jin Man Kim, Chungcheongnam-do (KR)

(73) Assignee: Mando Climate Control Corporation (KR)

( * ) Notice: Subject to any disclaimer, the term of this patent is extended or adjusted under 35 U.S.C. 154(b) by 0 days.

(21) Appl. No.: 09/911,742

(22) Filed: Jul. 25, 2001

(65) Prior Publication Data
US 2002/0038500 A1 Apr. 4, 2002

(30) Foreign Application Priority Data
Jul. 25, 2000 (KR) .......................... 2000-42702
Nov. 23, 2000 (KR) .......................... 2000-69848

(51) Int. Cl.⁷ ................................ B23P 15/26
(52) U.S. Cl. .................... 29/890.053; 29/890.054; 165/183; 165/177
(58) Field of Search ................ 29/890.053, 890.054, 29/428; 228/183; 165/177, 183

(56) References Cited

U.S. PATENT DOCUMENTS

| | | | | |
|---|---|---|---|---|
| 5,386,629 A | * | 2/1995 | Ouchi et al. | 29/890.046 |
| 5,579,837 A | * | 12/1996 | Yu et al. | 165/183 |
| 5,799,397 A | * | 9/1998 | Yasuda et al. | 29/890.052 |
| 5,875,668 A | * | 3/1999 | Kobayashi et al. | 72/181 |
| 5,890,288 A | * | 4/1999 | Rhodes et al. | 29/890.053 |
| 5,947,365 A | * | 9/1999 | Tanaka et al. | 228/136 |
| 6,234,243 B1 | * | 5/2001 | Murching et al. | 165/133 |
| 2001/0000879 A1 | * | 5/2001 | Sugawara et al. | 165/67 |
| 2001/0045277 A1 | * | 11/2001 | Shinhama et al. | 165/177 |

* cited by examiner

*Primary Examiner*—I Cuda Rosenbaum
(74) *Attorney, Agent, or Firm*—Bacon & Thomas, PLLC

(57) ABSTRACT

A coolant tube for use in a heat exchanger is manufactured by using a plate member as follows: the plate member is folded in substantially regular distances to form a plurality of folded portions; and two opposite ends of the plate member are joined in a manner that end parts of the folded portions are brought into contact with flat portions of the plate member to thereby form coolant flow passages.

5 Claims, 6 Drawing Sheets

METHOD FOR MANUFACTURING COOLANT TUBE OF HEAT EXCHANGER

FIELD OF THE INVENTION

The present invention relates to a coolant tube of a heat exchanger; and, more particularly, to a method and an apparatus for manufacturing coolant tube capable of improving the efficiency of a heat exchanging performance of a heat exchanger which is widely used as, e.g., a radiator of air conditioners.

BACKGROUND OF THE INVENTION

In general, a heat exchanger of a capacitor used as a radiator of air conditioners includes header pipes made of aluminum. The header pipes have a plurality of coolant tubes through which coolant flows. Heat exchange is performed between the coolant and an air flow while the coolant circulates through the coolant tubes.

Referring to FIG. 1, there is provided a conventional coolant tube 101. The coolant tube 101 is fabricated through an extrusion molding process via an extruding device such that a plurality of coolant circulation passages 102 is formed inside of the coolant tube 101. Alternatively, as shown in FIG. 2, a plurality of coolant circulation passages 104 can also be formed by installing inner fins 103 within a coolant tube 101 prepared by the extruding device.

However, such conventional coolant tube manufacturing methods exhibit certain drawbacks. First, since an extruding process for forming the coolant circulation passages 102 is sophisticated or a die for forming the inner fins 103 can not be readily manufactured, there exists a great deal of difficulty in fabricating the coolant tube. Further, coolant tubes 101 with an inadequate thickness and coolant circulation passages 102 with an improper shape are frequently produced in case where an extruding operation of the extruding device is not properly maintained. Still further, since the coolant circulation passages 102 formed in the coolant tube 101 are completely separated from each other, the coolant traveling through the coolant passages is forced to flow in one direction and a heat exchanging area of the coolant is inevitably limited. Consequently, the efficiency of the heat exchanger is greatly deteriorated.

SUMMARY OF THE INVENTION

It is, therefore, an object of the present invention to provide a method for fabricating a coolant tube capable of improving the efficiency of a heat exchanger.

It is another object of the present invention to provide an apparatus for manufacturing a coolant tube capable of improving the efficiency of a heat exchanger.

In accordance with one aspect of the present invention, there is provided a method for manufacturing a coolant tube of a heat exchanger by using a plate member, comprising the steps of: forming a plurality of folded portions on the plate member by folding the plate member in substantially regular distances; and joining opposite ends of the plate member in a manner that end parts of the folded portions are brought into contact with flat portions of the plate member to form coolant flow passages.

In accordance with another aspect of the present invention, there is provided an apparatus for manufacturing a coolant tube of a heat exchanger by using a plate member, comprising a roll including: a plurality of formation grooves for forming a plurality of folded portions on the plate member; and a roll having a plurality of flow groove formation units for forming flow grooves on the plurality of folded portions formed on the plate member, whereby the plurality of folded portions having the flow grooves are formed on the plate member when the plate member passes through the roll.

In accordance with still another aspect of the present invention, there is provided an apparatus for manufacturing a coolant tube of a heat exchanger by using a plate member, comprising: a rolling device for forming a plurality of folded portions on the plate member; and a die press having a plurality of protrusions formed at the bottom thereof so as to form flow grooves on an upper part of the folded portions.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
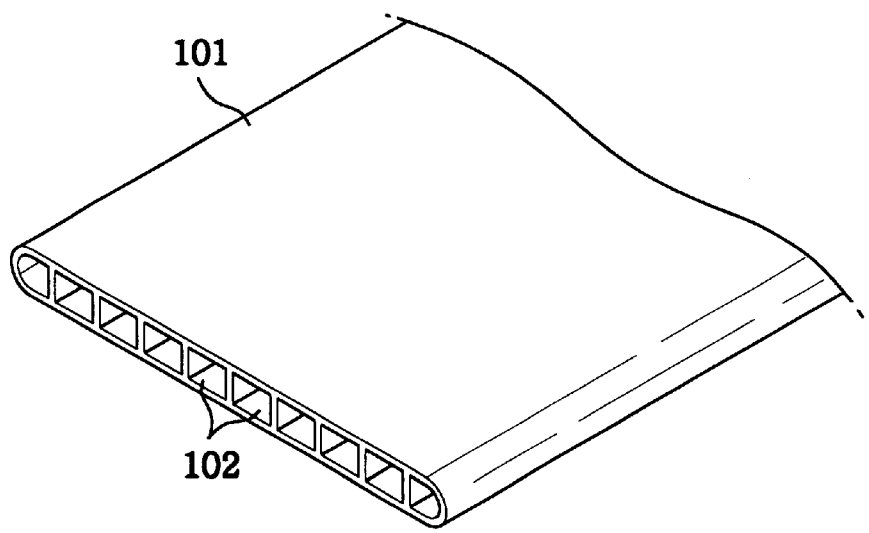
FIG. 1 is a perspective view of a conventional coolant tube of a heat exchanger.
Figure 2:
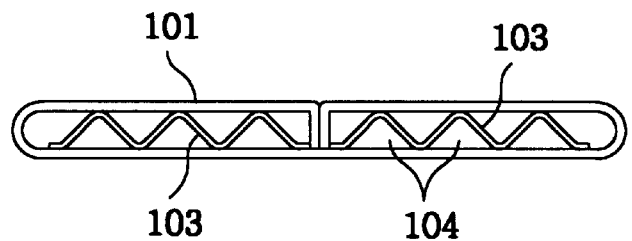
FIG. 2 provides a cross-sectional view of another conventional coolant tube of a heat exchanger.
Figure 3:
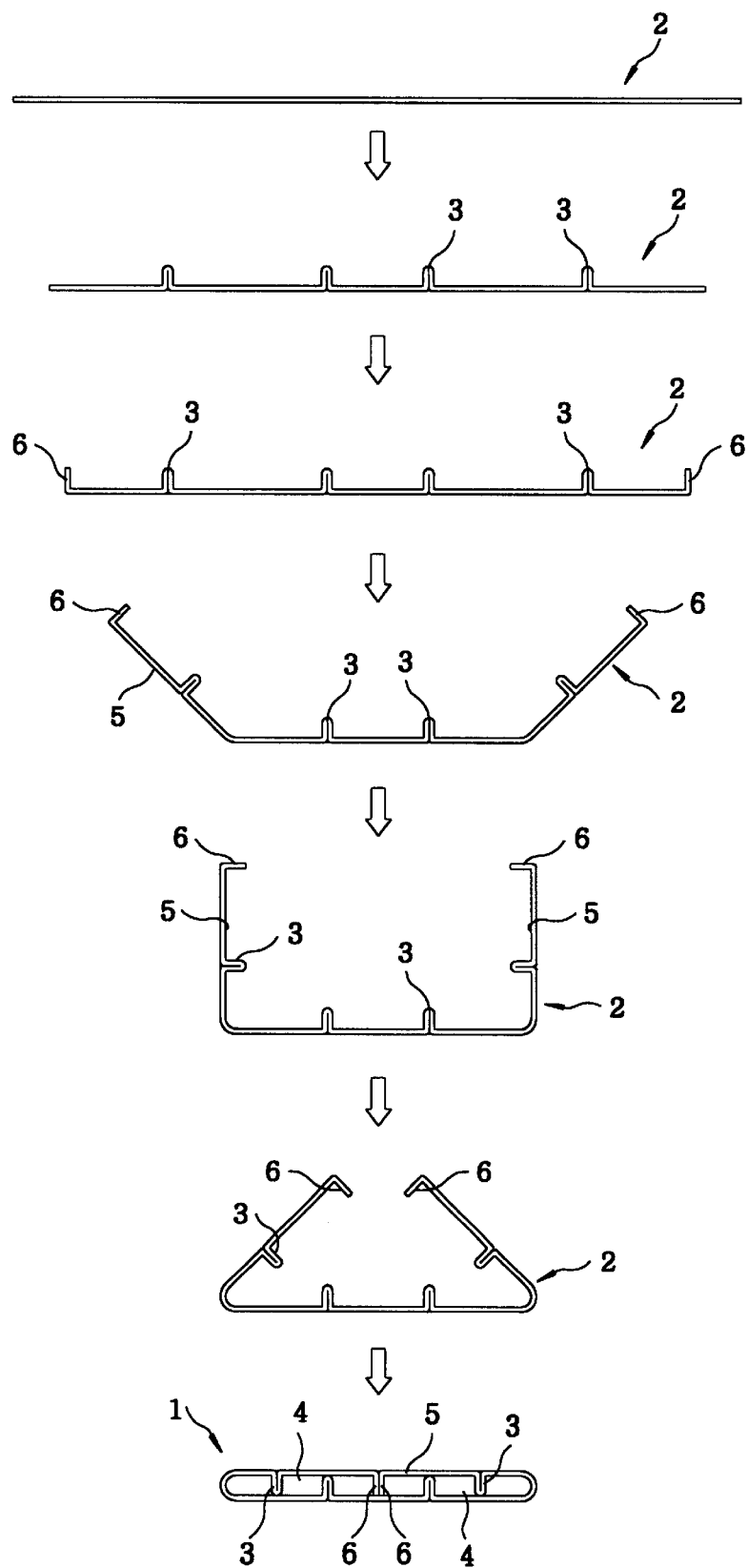
FIG. 3 is schematic drawing for demonstrating a manufacturing process of a coolant tube of the present invention.
Figure 4:
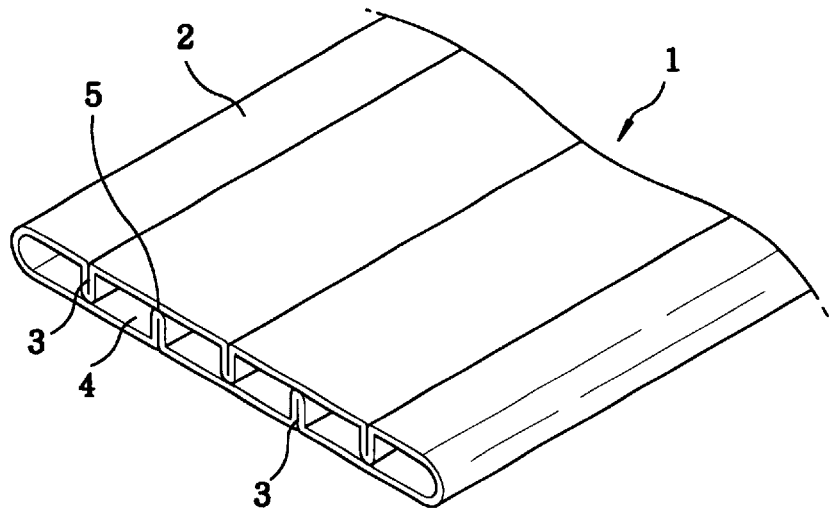
FIG. 4 depicts a cross-sectional view of a coolant tube manufactured in accordance with a first embodiment of the present invention.
Figure 5:
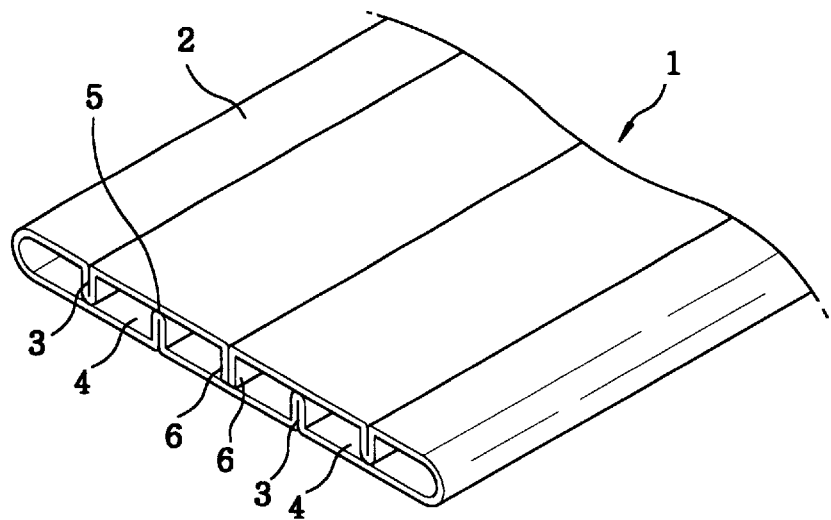
FIG. 5 offers a cross-sectional view of a coolant tube manufactured in accordance with a second embodiment of the present invention.

Referring to FIG. 3, there is illustrated a coolant tube 1 manufacturing process in accordance with a first embodiment of the present invention. A plate member 2 is folded with regular spacings therebetween by using a rolling device, e.g., a roller, to thereby form a plurality of folded portions 3. Then, two opposite ends of the plate member 2 are bended to form bended portions 6. Thereafter, the plate member 2 is shaped such that the bended portions 6 are brought in contact with each other and concurrently end portions of the bended portions 6 are brought in contact with flat portions of the plate member 2. Finally, the bended portions 6 are joined to produce a coolant tube 1.

Since one end of the folded portions 3 is adhered to the flat portions 5 of the plate member 2, flow passages 4 are formed between the folded portions 3. Further, since the bended portions 6 are joined at an inner position with respect to the two opposite ends of the plate member 2, flow passages are formed by the bended portions 6 as well.

In accordance with a second embodiment of the present invention, two end portions of a plate member 2 are joined through a high-frequency welding process or by forming clad at the two opposite ends of the plate member 2 and then brazing those clads.

Figure 6:
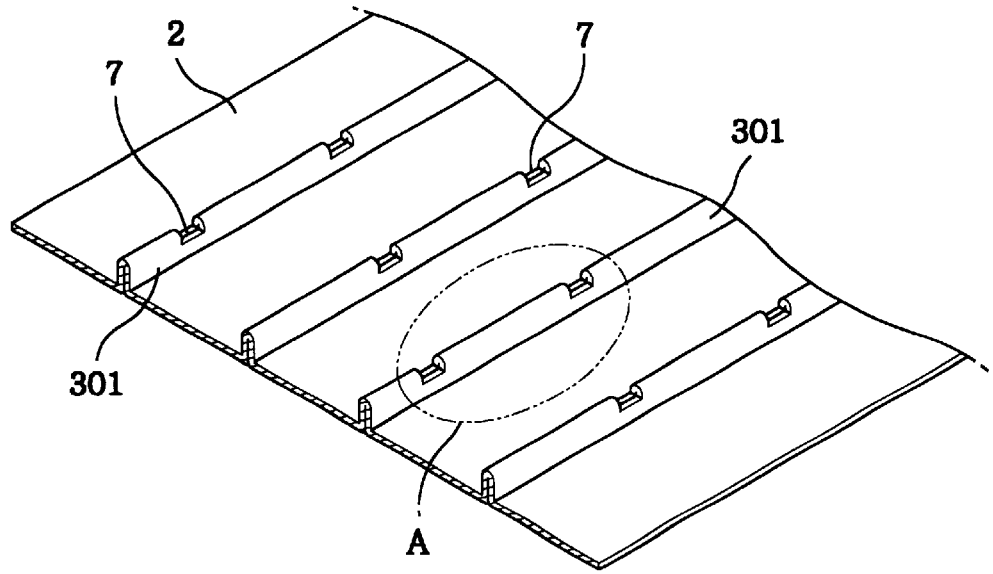
FIG. 6 presents a cross-sectional view of a plate member having folded portions with flow grooves formed thereon in accordance with a third embodiment of the present invention.
Figure 7:
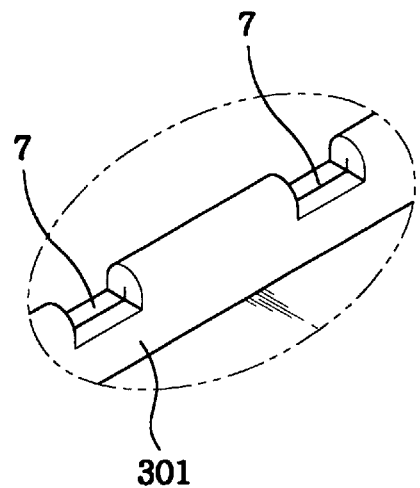
FIG. 7 sets forth an enlarged perspective view of part A in FIG. 6.
Figure 8:
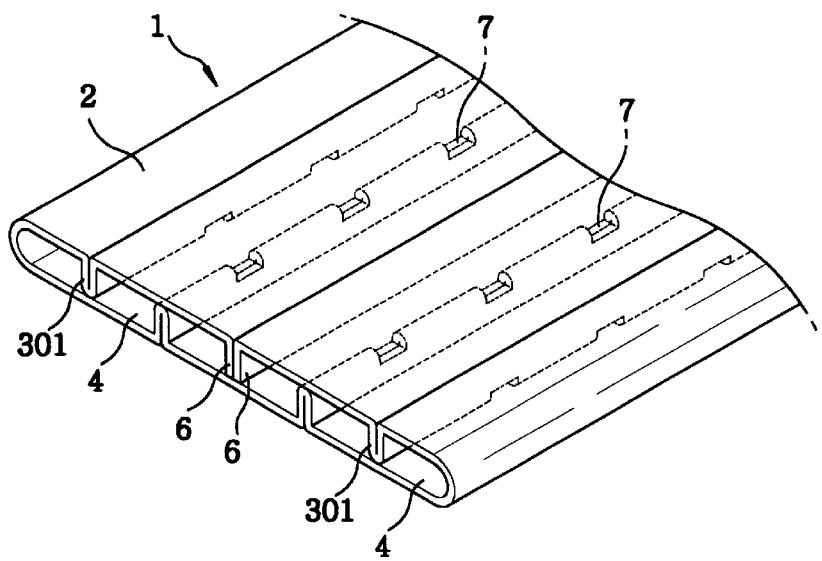
FIG. 8 exhibits a perspective view of a coolant tube made of the plate member in FIG. 5.

Referring to FIGS. 6 to 8, there is illustrated a coolant tube manufactured in accordance with a third embodiment of the present invention. A plurality of folded portions 301 are formed on a plate member 2 and a multiplicity of flow grooves 7 are formed on the prepared folded portions 301 with regular spacings therebetween. Then, two opposite end portions of the plate member 2 are joined to thereby produce a coolant tube 1.

Flow passages 4 of the coolant tube 1 in accordance with the third embodiment are communicated with neighboring flow passages 4 through the flow grooves 7 so that coolant can travel from one flow passage 4 to another one.

An apparatus for manufacturing a heat exchanger coolant tube having flow grooves will now be described hereinafter.

A plate member 2 is folded with regular spacings therebetween to form a plurality of folded portions 3 while passing through a roll 8 having a compression heat-treatment unit.

Figure 9:
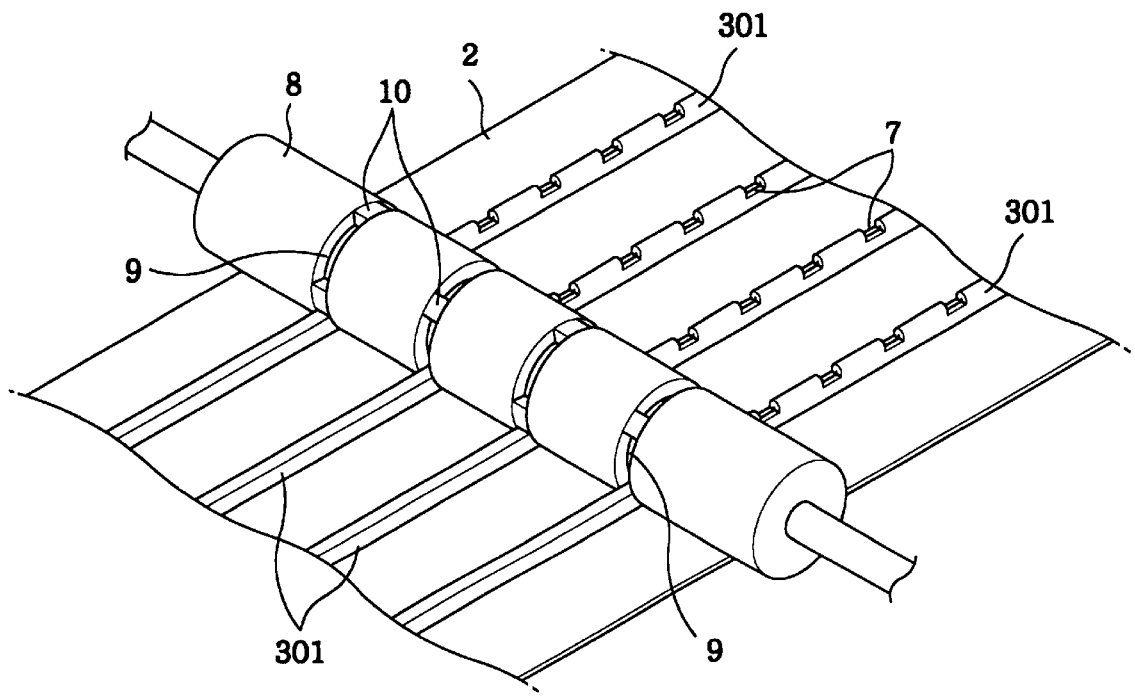
FIG. 9 shows a perspective view of a flow groove formation unit for forming flow grooves on folded portion of a plate member.

Referring to FIG. 9, the roll 8 includes a plurality of formation grooves 9 for forming folded portions 301 on the plate member 2 and a plurality of protrusions 10 prepared within the formation grooves 9 so as to form flow grooves on the folded portions. Accordingly, while the plate member undergoes the roll 8, the folded portions 301 and the flow grooves 7 can be simultaneously formed on the plate member 2.

Figure 10:
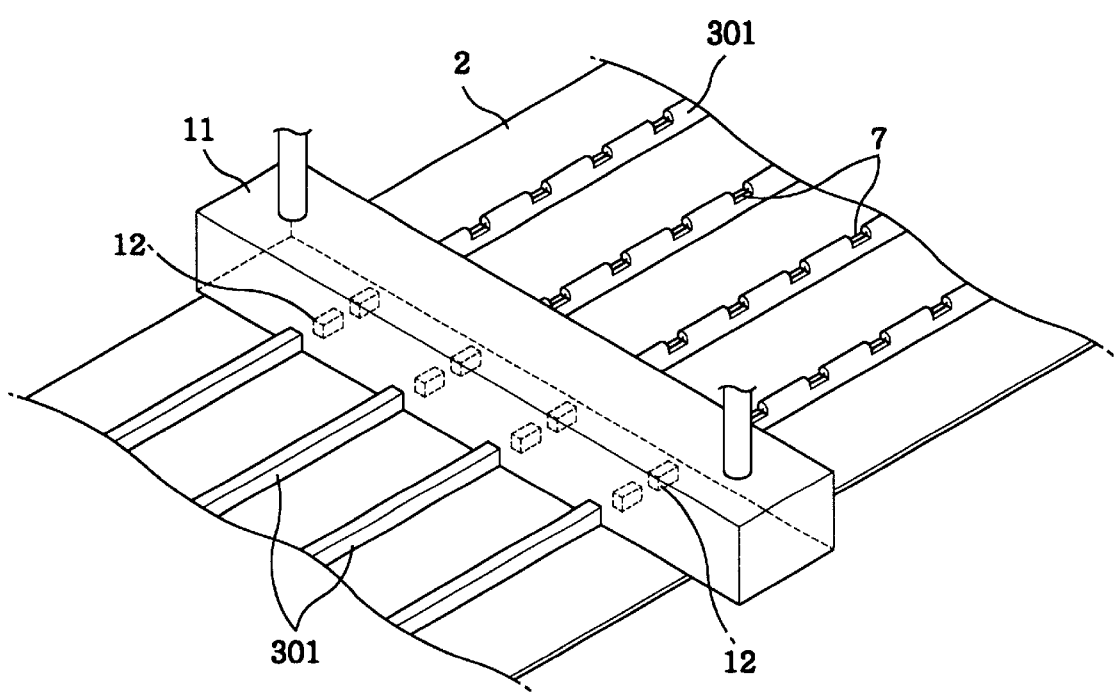
FIG. 10 illustrates a perspective view of another flow groove formation unit for forming flow groves on folded portions of a plate member.

To form the flow grooves 7, a die press 11, as shown in FIG. 10, can be employed. The die press 11 has a plurality of protrusions 12 positioned at the bottom thereof so as to form the flow grooves 7. The die press 11 forms the flow grooves 7 on the plate member 2 by pressing the folded portions 301 previously prepared by using a rolling device, e.g., a roller.

After the plurality of folded portions 3 are formed on the plate member 2, two opposite end portions of the plate member 2 are, for example, bended and joined by a high-frequency welding or by forming clad on the two ends of the plate member 2 and brazing those clads. As a result, flow passages 4 are formed between the folded portions 3 and a coolant tube is finally produced by adhering one end portion of each folded portion 3 to the flat portions 5 of the plate member 2.

Since the flow grooves 7 through which the coolant can pass are formed on the folded portions 301 of the plate member 2, the coolant flowing through the respective flow passages 4 of the coolant tube 1 can move from one flow passage to another. Thus, the coolant does not flow linearly through only one flow passage but can circulate all through the coolant tube 1.

As described above, the present invention provides an easy method for fabricating a coolant tube with a plurality of flow passages: a multiplicity of folded portions are formed on a plate member 2; the plate member having the folded portions formed thereon is heat-treated in a rectangular shape; and then two opposite end portions of the heat-treated plate member are joined to thereby produce a coolant tube 1 having the plurality of the flow passages.

Further, since a multiplicity of flow grooves are formed on the folded portions of the plate member for use in forming the flow passages of the coolant tube 1, the coolant can circulate all through the coolant tube 1 by passing through the flow grooves. Accordingly, a flow contact area of the coolant can be enlarged and the efficiency of heat transfer can be increased. Ultimately, the thermal efficiency of a heat exchanger can also be greatly improved.

Although the invention has been shown and described with respect to the preferred embodiments, it will be understood by those skilled in the art that various changes and modifications may be made without departing from the spirit and scope of the invention as defined in the following claims.

What is claimed is:

1. A method for manufacturing a coolant tube of a heat exchanger by using a plate member, comprising the steps of:
    forming a plurality of folded portions on the plate member by folding the plate member;
    forming a plurality of flow grooves on upper parts of the folded portions; and
    joining opposite ends of the plate member in a manner that end parts of the folded portions are brought into contact with flat portions of the plate member to form coolant flow passages, whereby some of the flow grooves are positioned higher than other ones of the flow grooves when viewed from a side of the coolant tube.

2. The method of claim 1, wherein the step of joining the plate member is achieved by bringing the opposite ends of the plate member into contact with each other and attaching the opposite ends.

3. The method of claim 2, wherein the step of attaching the opposite ends is performed by a high-frequency welding.

4. The method of claim 2, wherein the step of attaching the opposite ends is achieved by forming clad on the two opposite ends of the plate member and brazing the clads.

5. The method of claim 1, wherein the step of joining the plate member includes the steps of: forming bended portions by bending the opposite ends of the plate member; shaping the plate member such that the bended portions are brought in contact with each other and simultaneously ends of the bended portions are brought in contact with the flat portions of the plate member; and joining the bended portions.

* * * * *